United States Patent [19]

Hasegawa

[11] Patent Number: 5,208,806
[45] Date of Patent: May 4, 1993

[54] ISDN TERMINAL EQUIPMENT OPERATING WITH CIRCUIT SWITCHING MODE AND PACKET SWITCHING MODE

[75] Inventor: Kenichi Hasegawa, Inagi, Japan

[73] Assignee: Fujitsu Limited, Kanagawa, Japan

[21] Appl. No.: 614,518

[22] Filed: Nov. 16, 1990

[30] Foreign Application Priority Data

Nov. 17, 1989 [JP] Japan .................................. 1-297676

[51] Int. Cl.$^5$ .............................................. H04J 3/24
[52] U.S. Cl. ................................. 370/60.1; 370/94.1; 370/94.2
[58] Field of Search ...................... 370/94.1, 110.1, 79, 370/68, 94.2, 60.1, 85.3, 85.2, 85.1, 94.2; 375/121

[56] References Cited

U.S. PATENT DOCUMENTS

| | | | |
|---|---|---|---|
| 4,592,048 | 5/1986 | Beckner | 370/110.1 |
| 4,608,685 | 8/1986 | Jain et al. | 370/94.2 |
| 4,761,781 | 8/1988 | Calvignac | 370/79 |
| 4,763,321 | 8/1988 | Calvignac | 370/94.1 |
| 4,821,259 | 4/1989 | DeBruler | 370/68.1 |
| 4,961,186 | 10/1990 | Chandramouli | 370/79 |
| 4,999,832 | 3/1991 | Chen et al. | 370/59 |
| 5,023,868 | 6/1991 | Davidson | 370/58.2 |

FOREIGN PATENT DOCUMENTS

| | | |
|---|---|---|
| 0323083 | 7/1989 | European Pat. Off. . |
| 61-158244 | 7/1986 | Japan . |
| 1-240047 | 9/1989 | Japan . |

OTHER PUBLICATIONS

Falek et al., "Standards Makers Cementing ISDN Sub-network Layers", *Data Communications*, pp. 237-255, Oct. 1987 No. 11.
Peel, "International Extension of ISDN and Terminal Implications", *Data Communications*, pp. 171-176, Aug. 1988 No. 4.
O'Toole, "ISDN Terminals Simplify Data Transmissions", *Electrical Design News*, pp. 167-174, Jan. 22, 1987 No. 2.

Primary Examiner—Douglas W. Olms
Assistant Examiner—T. Samuel
Attorney, Agent, or Firm—Staas & Halsey

[57] ABSTRACT

ISDN terminal equipment containing: a circuit switching communication unit, a packet communication unit, a manual starting unit, an unsuccessful try detecting unit, and a retrying unit. The manual starting unit starts an operation of a setting up of a call using a predetermined one of the circuit switching communication unit and the packet communication unit when receiving a manual start input. The unsuccessful try detecting unit detects that data communication has not been successfully begun by the operation of the manual starting unit. The retrying unit starts an operation of a setting up of a call using the other of the circuit switching communication unit and the packet communication unit when the unsuccessful try detecting unit detects that the data communication has not been successfully begun by the operation of the manual starting unit.

10 Claims, 10 Drawing Sheets

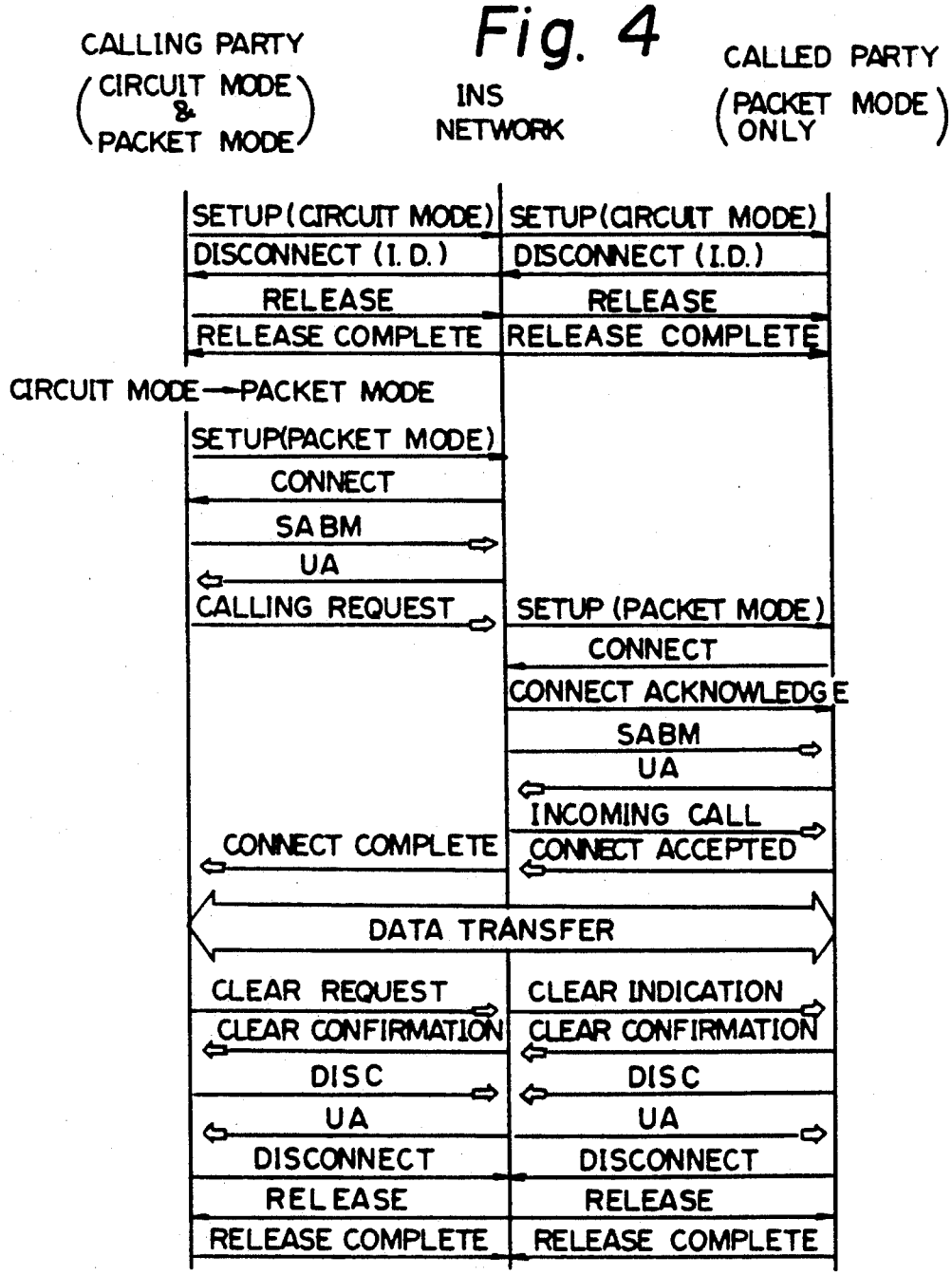

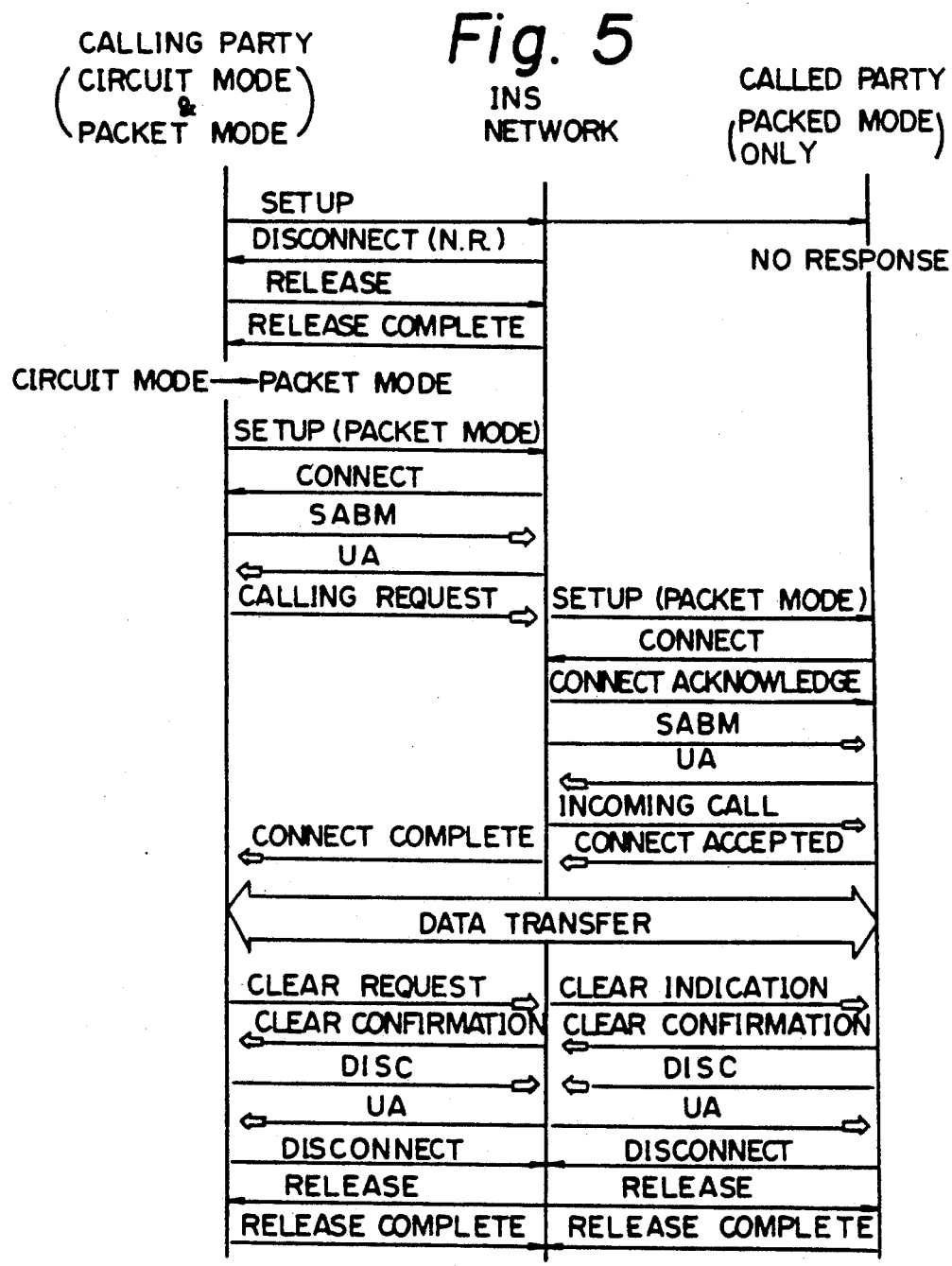

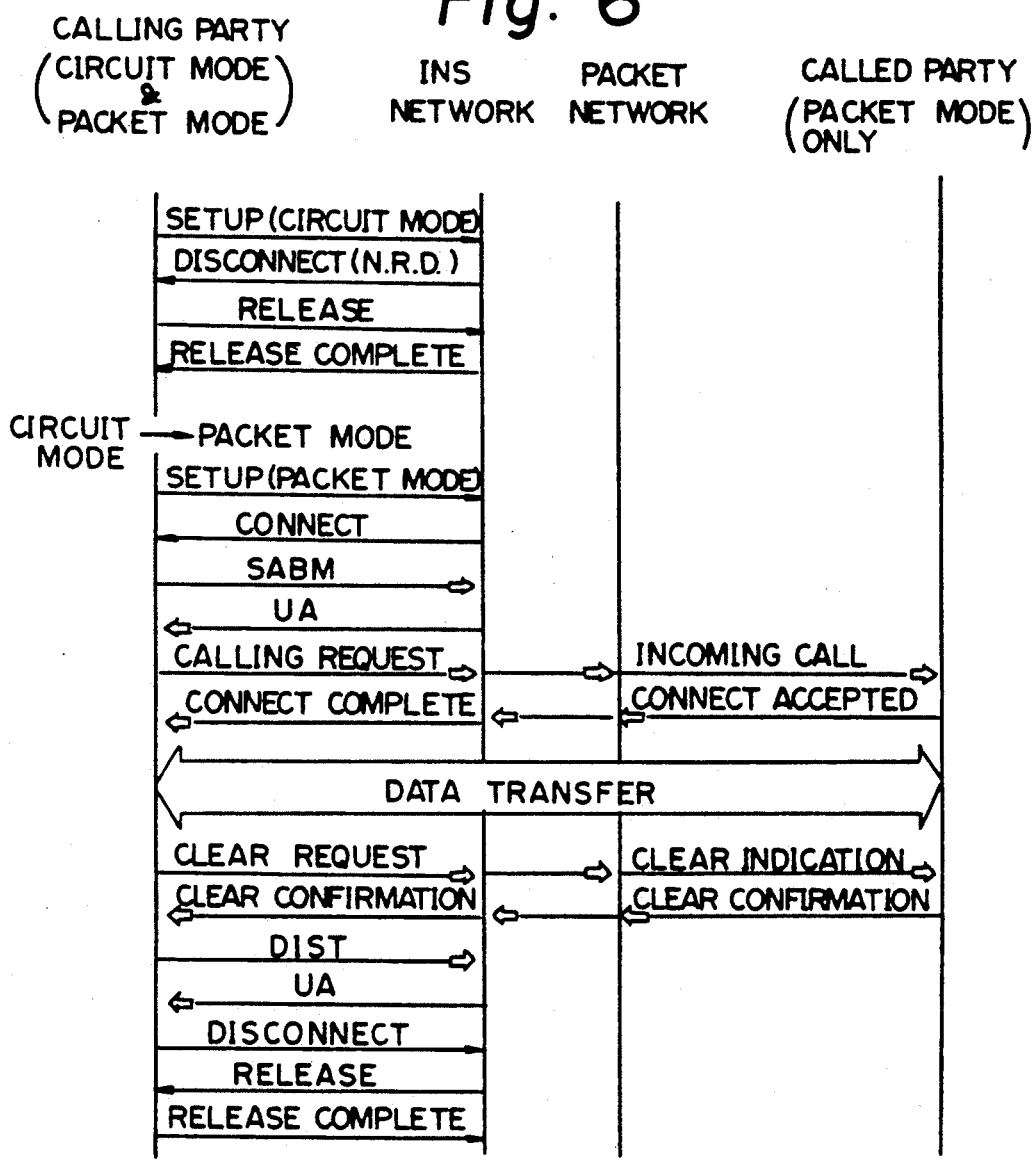

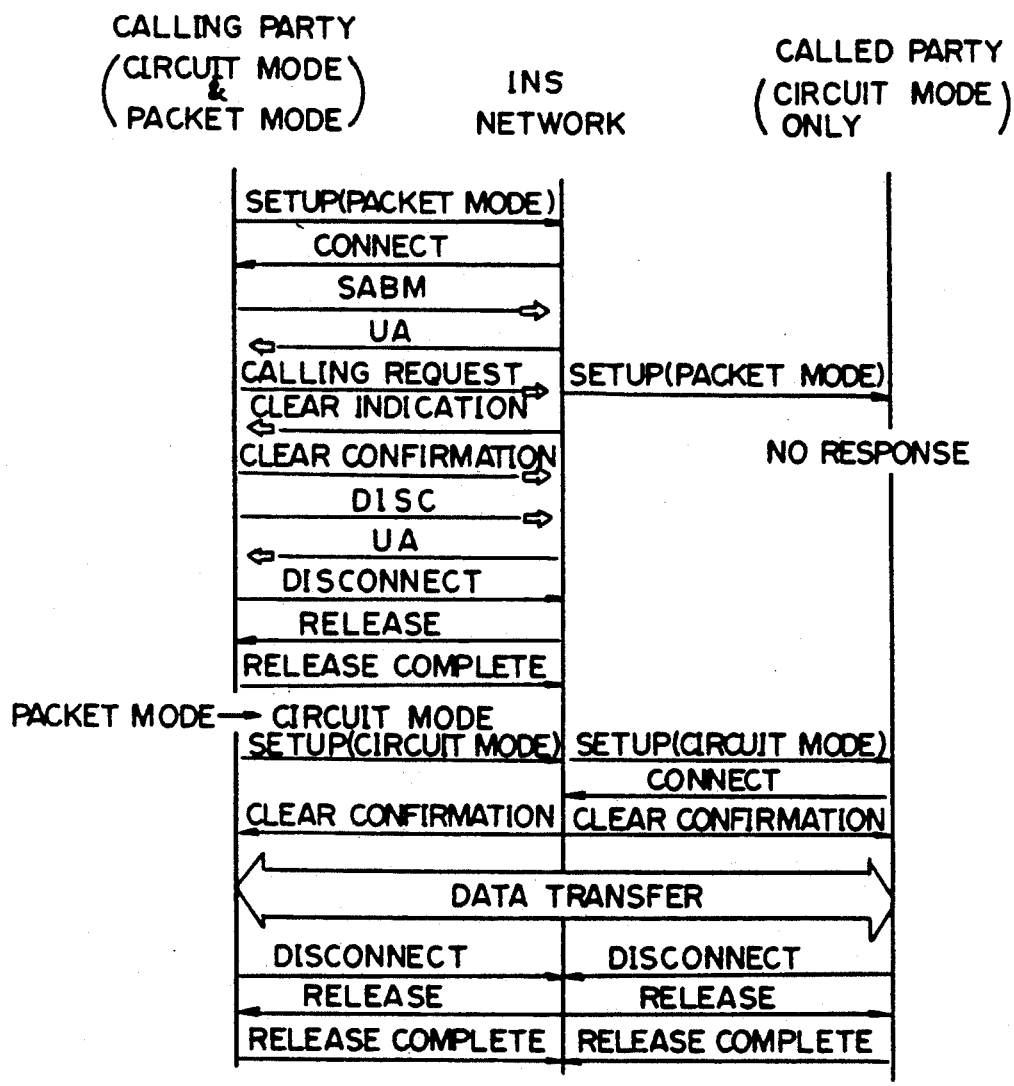

ISDN TERMINAL EQUIPMENT OPERATING WITH CIRCUIT SWITCHING MODE AND PACKET SWITCHING MODE

BACKGROUND OF THE INVENTION (1) Field of the Invention

The present invention relates to ISDN (Integrated Services Digital Network) terminal equipment which can operate with either a circuit switching (circuit switched) communication system or a packet switching communication system.

For example, there are three types of G4 facsimile terminal equipment which can be connected to an ISDN network: the first type can carry out data communication by a circuit switching mode only, the second type can carry out data communication by a packet switching mode only, and the third type can carry out data communication by either the circuit switching mode (circuit mode) or the packet switching mode (packet mode). However, generally, a calling party does not know which type of G4 facsimile terminal equipment is connected to the ISDN network at a called party.

(2) Description of the Related Art

In conventional G4 facsimile terminal equipment which can carry out data communication by either the circuit switching mode or the packet switching mode, an operator must set manually the G4 facsimile terminal equipment to the circuit switching mode or the packet switching mode when starting data communication (sending facsimile data). When the operator does not know which type of G4 facsimile terminal equipment is connected to the ISDN network at a called party, the operator first tries data communication by one of the circuit switching mode and the packet switching mode. If the data communication cannot be carried out normally by that mode, the operator tries data communication again by using the other mode; where the setting and changing of the modes are carried out manually by the operator. Namely, bothersome manual operations are required for the operator of the calling party in the conventional G4 facsimile terminal equipment.

SUMMARY OF THE INVENTION

An object of the present invention is to provide ISDN (Integrated Services Digital Network) terminal equipment which can operate with either a circuit switching communication system or a packet switching communication system, and which can be operated by a simple manual operation even when an operator does not know which type of G4 facsimile terminal equipment is connected to the ISDN network at a called party.

According to the present invention, there is provided ISDN terminal equipment containing: a circuit switching communication unit, a packet communication unit, a manual starting unit, an unsuccessful try detecting unit, and a retrying unit. The circuit switching communication unit carries out data communication in accordance with a circuit switching communication procedure. The packet communication unit carries out data communication in accordance with a packet communication procedure. The manual starting unit starts an operation of setting up a call using a predetermined one of the circuit switching communication unit or the packet communication unit when receiving a manual start input. The unsuccessful try detecting unit detects that data communication has not been successfully begun by the operation of the manual starting unit. The retrying unit starts an operation of setting up a call using the other of the circuit switching communication unit or the packet communication unit when the unsuccessful try detecting unit detects that the data communication has not been successfully begun by the operation of the manual starting unit.

BRIEF DESCRIPTION OF THE DRAWINGS

In the drawings:

FIGS. 4, and 5 each show an example message sequence between terminal equipment according to the first embodiment of the present invention and terminal equipment at the called party through the INS network, where both the terminal equipment according to the first embodiment of the present invention and the terminal equipment at the called party are connected to the INS network, the terminal equipment at the called party can operate in accordance with a packet switching communication procedure only, and the terminal equipment according to the first embodiment of the present invention, first tries data communication by a circuit switching mode;

FIG. 6 shows an example message sequence between terminal equipment according to the first embodiment of the present invention and terminal equipment at the called party, through the INS network and a packet communication network which is connected to the INS network, where the terminal equipment according to the first embodiment is connected to the INS network, and the terminal equipment at the called party is connected to the packet communication network, and can operate in accordance with a packet switching communication procedure only, in the case the terminal equipment according to the first embodiment of the present invention, first tries data communication by a circuit switching mode;

FIGS. 8, and 9 each show an example message sequence between terminal equipment according to the second embodiment of the present invention and terminal equipment at the called party through the INS network, where both the terminal equipment according to the second embodiment of the present invention and the terminal equipment at the called party are connected to the INS network, the terminal equipment at the called party can operate in accordance with a circuit switching communication procedure only, and the terminal equipment according to the second embodiment of the present invention, first tries data communication by a packet switching mode.

DESCRIPTION OF THE PREFERRED EMBODIMENTS (1) Basic Operation of the Present Invention Before describing the preferred embodiment of the present invention, first, the basic operations of the various aspects of the present invention are explained below.

Figure 1:
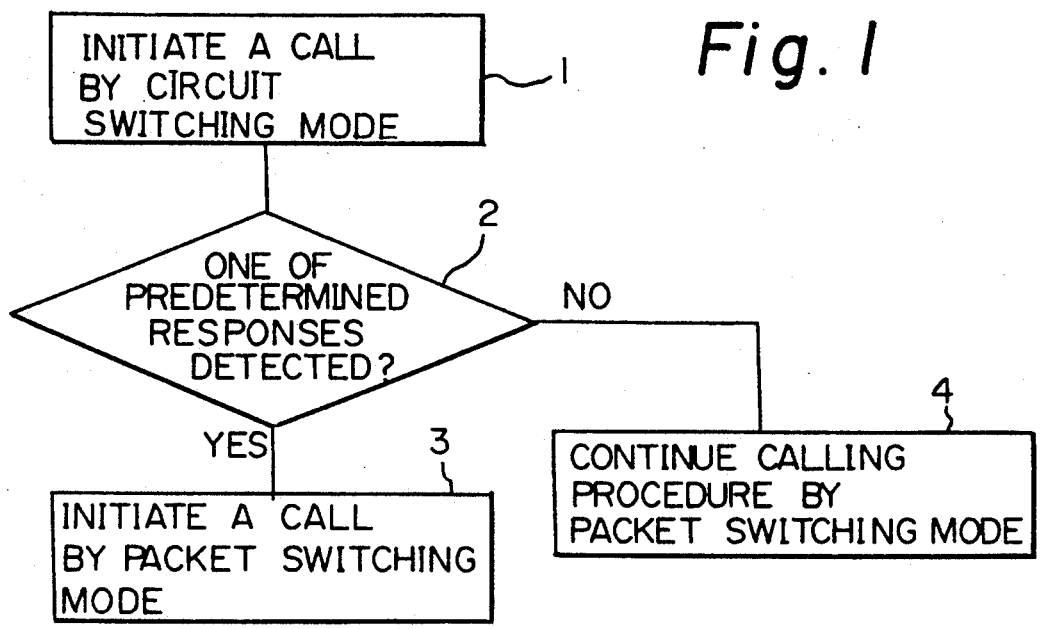
FIGS. 1 and 2 each show a basic operation of the present invention.

FIG. 1 shows an operation of the terminal equipment according to the present invention. In the operation of FIG. 1, first, in step 1, the terminal equipment at the calling party starts a calling operation by the circuit switching mode responding to a starting operation by an operator.

Hereinafter, all denotations of messages which are denoted by capital characters are the same as those defined by the CCITT recommendation Q. 931, and the ISDN network may be denoted by "the network".

In the step 2, it is determined whether or not a predetermined state of a response from the network is detected.

When it is determined that the above predetermined state is detected, in step 3, the terminal equipment at the calling party starts a calling operation by the packet switching mode. In the ISDN network, for example, the INS network in Japan, when the terminal equipment in the called party is not able to carry out data communication by the circuit switching mode, a DISCONNECT message may be returned from the network, where the DISCONNECT message includes a cause information element as defined by the CCITT recommendation Q. 931, and the cause information element may indicate "No Route to Destination", "No User Responding", or "Incompatible Destination". Namely, in this case, the above predetermined state is a state of the terminal equipment at the calling party, receiving the DISCONNECT message as above.

When it is determined that the above predetermined state is not detected, in the step 4, the terminal equipment at the calling party continues the data communication procedure in accordance with the circuit switching mode.

Figure 2:
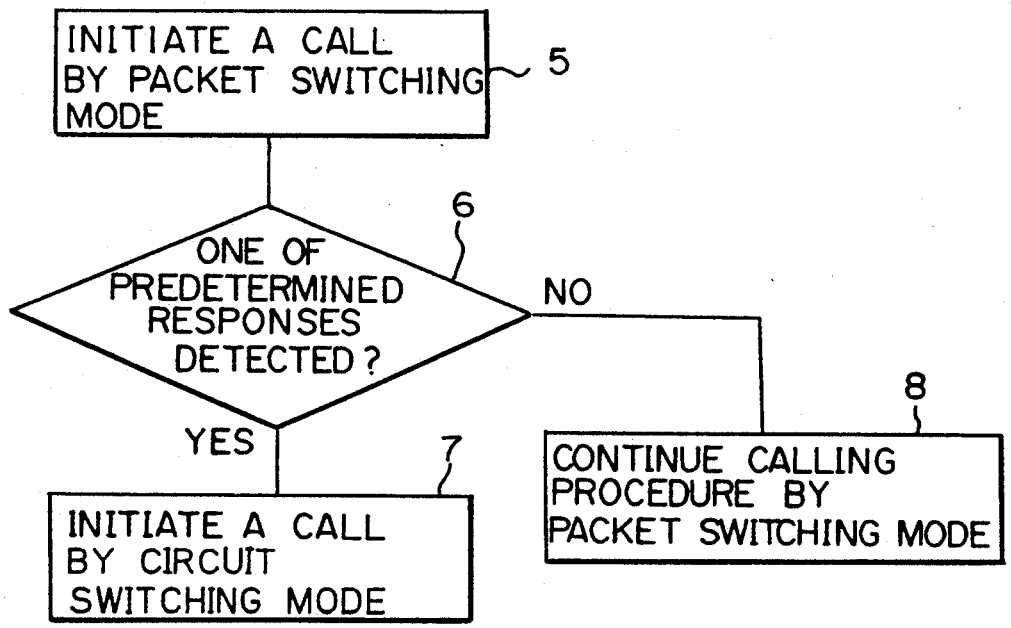

FIG. 2 shows another operation of the terminal equipment according to the present invention. In the operation of FIG. 2, first, in the step 5, the terminal equipment at the calling party sends a SETUP message to the ISDN network by the packet switching mode responding to a starting operation by an operator.

In the step 6, it is determined whether or not a predetermined state of a response from the network is detected.

When it is determined that the above predetermined state is detected, in the step 7, the terminal equipment at the calling party starts a calling operation by the circuit switching mode. In the ISDN network, for example, the INS network in Japan, when the terminal equipment in the called party is not in the state being able to carry out data communication by the packet switching mode, a Clear Indication packet may be returned from the network, where the Clear Indication packet includes a cause information element as defined by the CCITT recommendation X.25, and the cause information element may indicate "Remote Procedure Error", "Out of Order", or "Remote DTE Operational".

When it is determined that the above predetermined state is not detected, in the step 8, the terminal equipment at the calling party continues the data communication procedure in accordance with the packet switching mode.

As explained above, according to the present invention, when the terminal equipment in the called party seems not to be in the state to carry out data communication by the same communication mode as the mode by which the terminal equipment in the calling party starts a calling procedure, the terminal equipment in the calling party detects that situation, automatically changes the communication mode responding to the detection, and retries the start of a calling procedure in accordance with the changed communication mode. Thus, bothersome manual operations are not required for the operator in the calling party.

(2) Operation of the First Embodiment

Figure 3A:
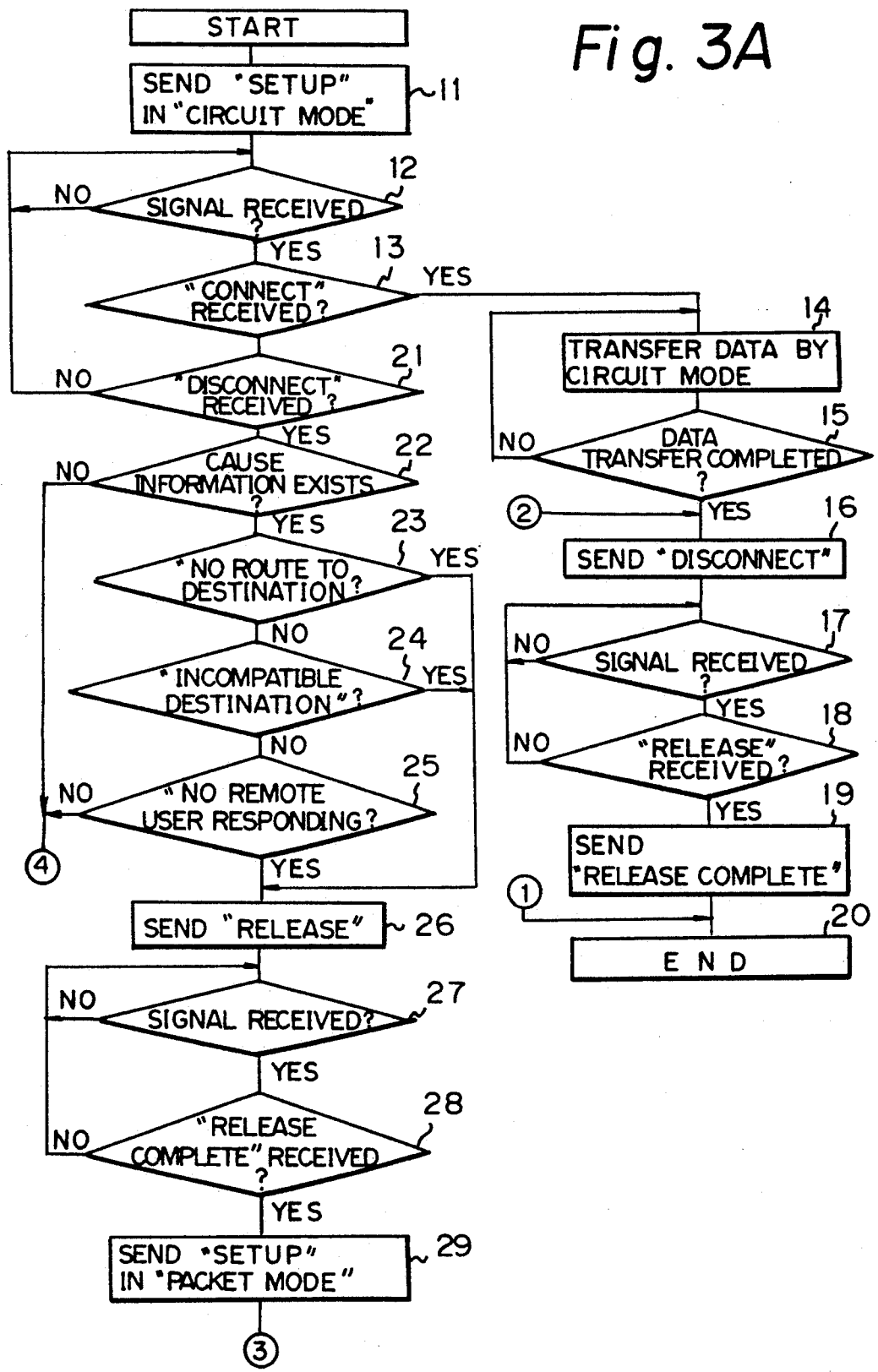
FIGS. 3A and 3B shows an operation of terminal equipment according to the first embodiment of the present invention.
Figure 3B:
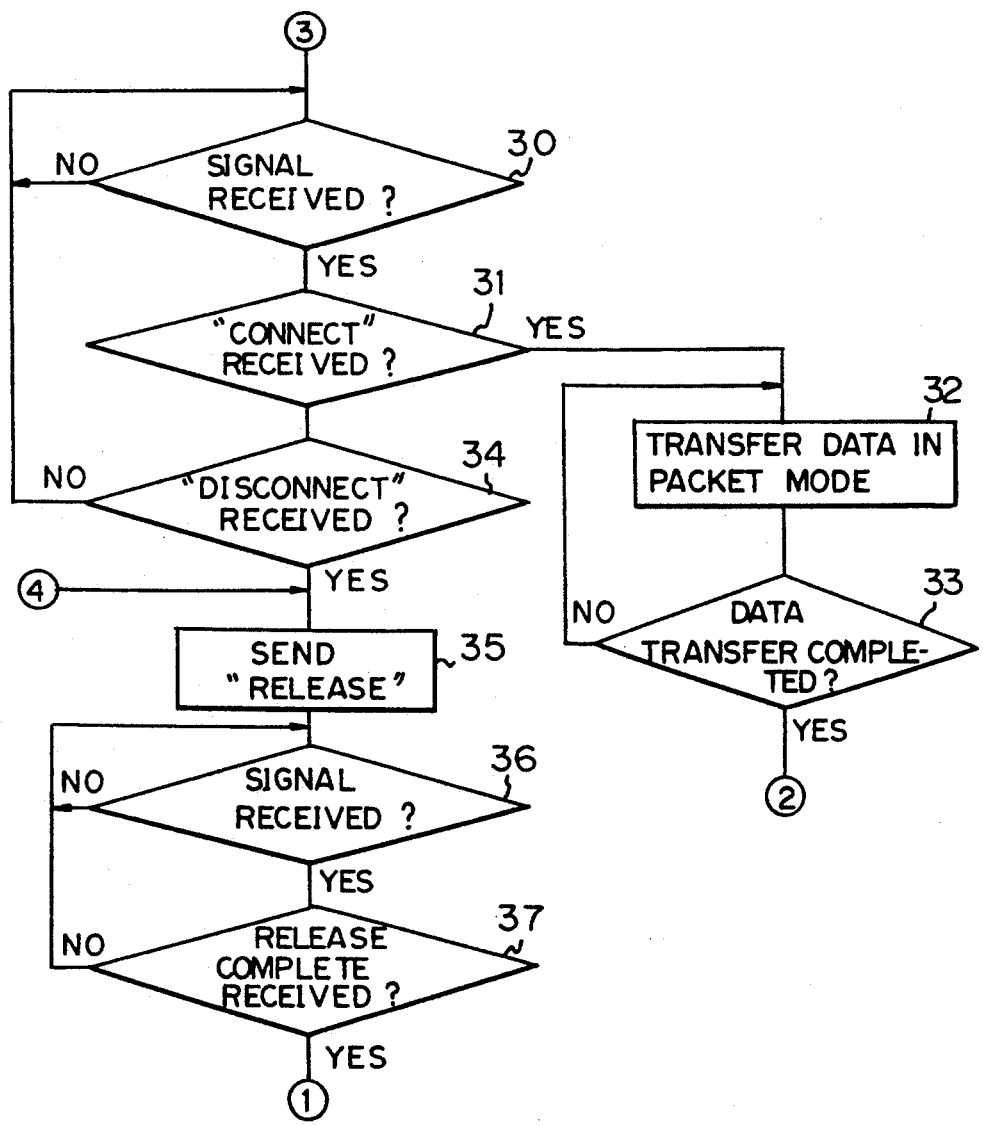

FIGS. 3A and 3B shows an operation of terminal equipment according to the first embodiment of the present invention, wherein the terminal equipment can operate with either a circuit switching system or a packet switching system. In the first embodiment, the terminal equipment first starts a calling procedure by the circuit switching mode.

In the step 11 in FIG. 3A, the terminal equipment sends a SETUP message to the network to initiate a call, where the SETUP message includes the bearer capability information element wherein the transfer mode is set to "circuit mode" which corresponds to the above-mentioned circuit switching mode. The "bearer capability information element", the "transfer mode", and the circuit mode" are defined in the CCITT Q. 931.

Next, when the terminal equipment receives a CONNECT message from the network in the steps 12 and 13, the operation goes to the step 14 to transfer data in accordance with the circuit switching mode. When it is determined that all the data has been transferred in the step 15, the terminal equipment sends a DISCONNECT message to the network in the step 16. Then, when the terminal equipment receives a RELEASE message from the network in the steps 17 and 18, the operation goes to the step 19 to transfer a RELEASE COMPLETE message to the network to complete the communication.

When the terminal equipment does not receive a CONNECT message from the network in the steps 12 and 13, the operation goes to the step 21 to determine whether or not a DISCONNECT message is received from the network. Then, it is determined whether or not a cause information element is included in the DISCONNECT message in the step 22. When yes is determined in the step 22, it is determined what the cause information element indicates in the steps 23, 24, and 25. In the example of FIG. 3A, the determinations are carried out regarding the cause information elements "No Route to Destination", "Incompatible Destination", are "No User Responding". Although one of the above is sent from the current INS network in Japan when the terminal equipment in the called party is not able to carry out data communication by the same mode as the terminal equipment in the calling party (the circuit switching mode), other cause information elements may be included in the DISCONNECT message in other ISDN networks, and those can be known by experiment.

When any of the above cause information elements is not received in the steps 23, 24, and 25, or when no is determined in the step 22, the operation goes to the step 35 to send a RELEASE message. Then, when a RELEASE message is received in the steps 36 and 37, the operation goes to the step 20 to complete the communication.

When one of the above cause information elements is received in the steps 23, 24, and 25, the operation goes to the step 26 to send a RELEASE message to the network. Then, when a RELEASE message is received in the steps 27 and 28, the operation goes to the step 29 to retry a calling procedure by the packet switching mode, i.e., the terminal equipment sends a SETUP message which includes a transfer mode element which is set as "packet mode", to the network.

Next, when the terminal equipment receives a CONNECT message from the network in the steps 30 and 31, the operation goes to the step 32 to transfer data in accordance with the packet switching mode. When it is determined that all the data has been transferred in the step 33, the terminal equipment sends a DISCONNECT message to the network in the step 16. Then, when the terminal equipment receives a RELEASE message from the network in the steps 17 and 18, the operation goes to the step 19 to transfer a RELEASE COMPLETE message to the network to complete the communication.

When the terminal equipment does not receive a CONNECT message from the network in the steps 30 and 31, the operation goes to the step 35 to determine whether or not a DISCONNECT message is received from the network. Then, when a RELEASE message is received in the steps 36 and 37, the operation goes to the step 20 to complete the communication.

FIGS. 4, and 5 each show an example message sequence between terminal equipment according to the first embodiment of the present invention and terminal equipment at the called party through the INS network, where both the terminal equipment according to the first embodiment of the present invention and the terminal equipment at the called party are connected to the INS network, the terminal equipment at the called party can operate in accordance with a packet switching communication procedure only, and the terminal equipment according to the first embodiment of the present invention, first tries data communication by a circuit 1 switching mode.

In the sequence of FIG. 4, a SETUP message is sent from the terminal equipment at the calling party to the INS network, where the SETUP message includes a transfer mode element which is set to "circuit mode". Receiving the above, the SETUP message is sent to the terminal equipment at the called party. Since the terminal equipment at the called party cannot carry out data communication by the circuit switching mode, the terminal equipment at the called party returns a RELEASE message to the INS network, where the RELEASE message includes a cause information element indicating the "Incompatible Destination". Receiving the RELEASE message, the INS network sends a DISCONNECT message to the terminal equipment at the calling party, where the RELEASE message includes a cause information element indicating the "Incompatible Destination". Receiving the DISCONNECT message, the terminal equipment at the calling party sends a RELEASE message to the INS network. Receiving the RELEASE message, the INS network sends a RELEASE COMPLETE message to both parties, terminal equipment at the calling party and the terminal equipment at the called party to complete the data communication by the circuit switching mode.

Receiving the above RELEASE COMPLETE message from the INS network, the terminal equipment at the calling party sends a SETUP message to the INS network, where the SETUP message includes a transfer mode element which is set to "packet mode". Responding to the above, the INS network returns a CONNECT message to the terminal equipment at the calling party, and thereby the terminal equipment at the calling party is allowed to use a B channel in the INS network. Then, the terminal equipment at the calling party sends an SABM (Set Asynchronous Balanced Mode) command (the CCITT recommendation X. 25) to the INS network through the B-channel to establish a link between the terminal equipment at the calling party and the INS network in accordance with the HDLC (High level data link) and LAPB (Link Access Procedure for B channel) procedure. Responding to the SABM command, the INS network returns a UA response to the terminal equipment at the calling party to acknowledge the receipt and acceptance of the SABM command. Receiving the UA response, the terminal equipment at the calling party sends a Calling Request packet (X. 25) to the INS network.

Receiving the Calling Request packet, the INS network sends a SETUP message to the terminal equipment at the called party. Since the terminal equipment at the called party is in the state being able to carry out data communication by the packet switching mode, the terminal equipment at the called party returns a CONNECT message to the INS network. Receiving the CONNECT message, the INS network sends a CONNECT ACKNOWLEDGE message to the terminal equipment at the called party. Thus, a B-channel can be used between the terminal equipment at the called party and the INS network, and the INS network sends an SABM command to the terminal equipment at the called party through the B-channel. Receiving the SABM command, the terminal equipment at the called party returns a UA response to the INS network. Receiving the UA response from the terminal equipment at the called party, the INS network sends an Incoming Call packet (X. 25) to the terminal equipment at the called party, and the terminal equipment at the called party returns the Connect Accepted packet (X. 25) to the INS network, and the INS network sends a Connect Complete packet (X. 25) to the terminal equipment at the calling party. Thus, a data transfer can be carried out between the terminal equipment at the calling party and the terminal equipment at the called party through the INS network.

When the above data transfer is completed, the terminal equipment at the calling party sends a Clear Request packet (X. 25) to the INS network. Receiving the Clear Request packet, the INS network sends a Clear Indication packet (X. 25) to the terminal equipment at the called party. Responding to the Clear Indication packet, the terminal equipment at the called party returns a Clear Confirmation packet (X. 25) to the INS network, and the Clear Confirmation packet is sent to the terminal equipment at the calling party. Then, both the terminal equipment at the calling party and the terminal equipment at the called party each send a Disconnect frame (DISC) to the INS network, and then, the INS network returns a UA response to both parties' terminal equipment. Thus, the control is shifted from the B-channel to the D-channel, and both parties' terminal equipment each send a DISCONNECT message to the INS network. Then, the INS network sends a RELEASE message to both parties' terminal equipment, and, responding to the RELEASE message, both terminal equipment each return a RELEASE COMPLETE message to the INS network to complete the data communication.

In the sequence of FIG. 5, when a SETUP message of the circuit switching mode is sent to the terminal equipment at the called party, where the terminal equipment at the called party is not in the state being able to carry out data communication by the circuit switching mode, the terminal equipment at the called party returns no response. When no response is returned from the terminal equipment at the called party for a predetermined time, the INS network sends a DISCONNECT message to the terminal equipment at the calling party, where the DISCONNECT message includes a cause information element of "No user responding". Receiving the DISCONNECT message, the terminal equipment at the calling party sends a RELEASE message to the INS network. Thereafter, the rest of the sequence is the same as the sequence of FIG. 4.

FIG. 6 shows an example message sequence between terminal equipment according to the first embodiment of the present invention and terminal equipment at the called party, through the INS network and a packet communication network which is connected to the INS network, where the terminal equipment according to the first embodiment is connected to the INS network, and the terminal equipment at the called party is connected to the packet communication network, and can operate in accordance with a packet switching communication procedure only, and the terminal equipment according to the first embodiment of the present invention, first tries data communication by a circuit switching mode.

In the sequence of FIG. 6, since the terminal equipment at the called party is connected to a packet communication network, a SETUP message is sent from the terminal equipment at the calling party to the INS network, where the SETUP message includes a transfer mode element which is set to "circuit mode". Responding to the above, the INS network returns a DISCONNECT message to the terminal equipment at the calling party, where the RELEASE message includes the cause information element indicating the "No Route to Destination". Receiving the DISCONNECT message, the terminal equipment at the calling party sends a RELEASE message to the INS network. Responding to the RELEASE message, the INS network sends a RELEASE COMPLETE message to the terminal equipment at the calling party to complete the data communication by the circuit switching mode.

Receiving the above RELEASE COMPLETE message from the INS network, the terminal equipment at the calling party sends a SETUP message to the INS network, where the SETUP message includes a transfer mode element which is set to "packet mode". Responding to the above, the INS network returns a CONNECT message to the terminal equipment at the calling party, and thereby the terminal equipment at the calling party is allowed to use a B-channel in the INS network. Then, the terminal equipment at the calling party sends an SABM command (X. 25) to the INS network through the B-channel to establish a link between the terminal equipment at the calling party and the INS network in accordance with the HDLC and LAPB procedure. Responding to the SABM command, the INS network returns a UA response to the terminal equipment at the calling party to acknowledge the receipt and acceptance of the SABM command. Receiving the UA response, the terminal equipment at the calling party sends a Calling Request packet (X. 25) to the INS network.

Receiving the Calling Request packet, the INS network sends an Incoming Call packet (X. 25) to the terminal equipment at the called party through the packet communication network, and the terminal equipment at the called party returns the Connect Accepted packet (X. 25) to the INS network through the packet communication network, and the INS network sends a Connect Complete packet (X. 25) to the terminal equipment at the calling party. Thus, a data transfer can be carried out between the terminal equipment at the calling party and the terminal equipment at the called party through the INS network and the packet communication network.

When the above data transfer is completed, the terminal equipment at the calling party sends a Clear Request packet (X. 25) to the INS network. Receiving the Clear Request packet, the INS network sends a Clear Indication packet (X. 25) to the terminal equipment at the called party through the packet communication network. Responding to the Clear Indication packet, the terminal equipment at the called party returns a Clear Confirmation packet (X. 25) to the INS network through the packet communication network, and the Clear Confirmation packet is sent to the terminal equipment at the calling party. Then, the terminal equipment at the calling party sends a Disconnect frame (DISC) to the INS network, and then, the INS network returns a UA response to the terminal equipment at the calling party. Thus, the control is shifted from the B-channel to the D-channel, and the terminal equipment at the calling party sends a DISCONNECT message to the INS network. Then, the INS network returns a RELEASE message to the terminal equipment at the calling party, and, responding to the RELEASE message, the terminal equipment at the calling party returns a RELEASE COMPLETE message to the INS network to complete the data communication.

(3) Operation of the Second Embodiment

Figure 7A:
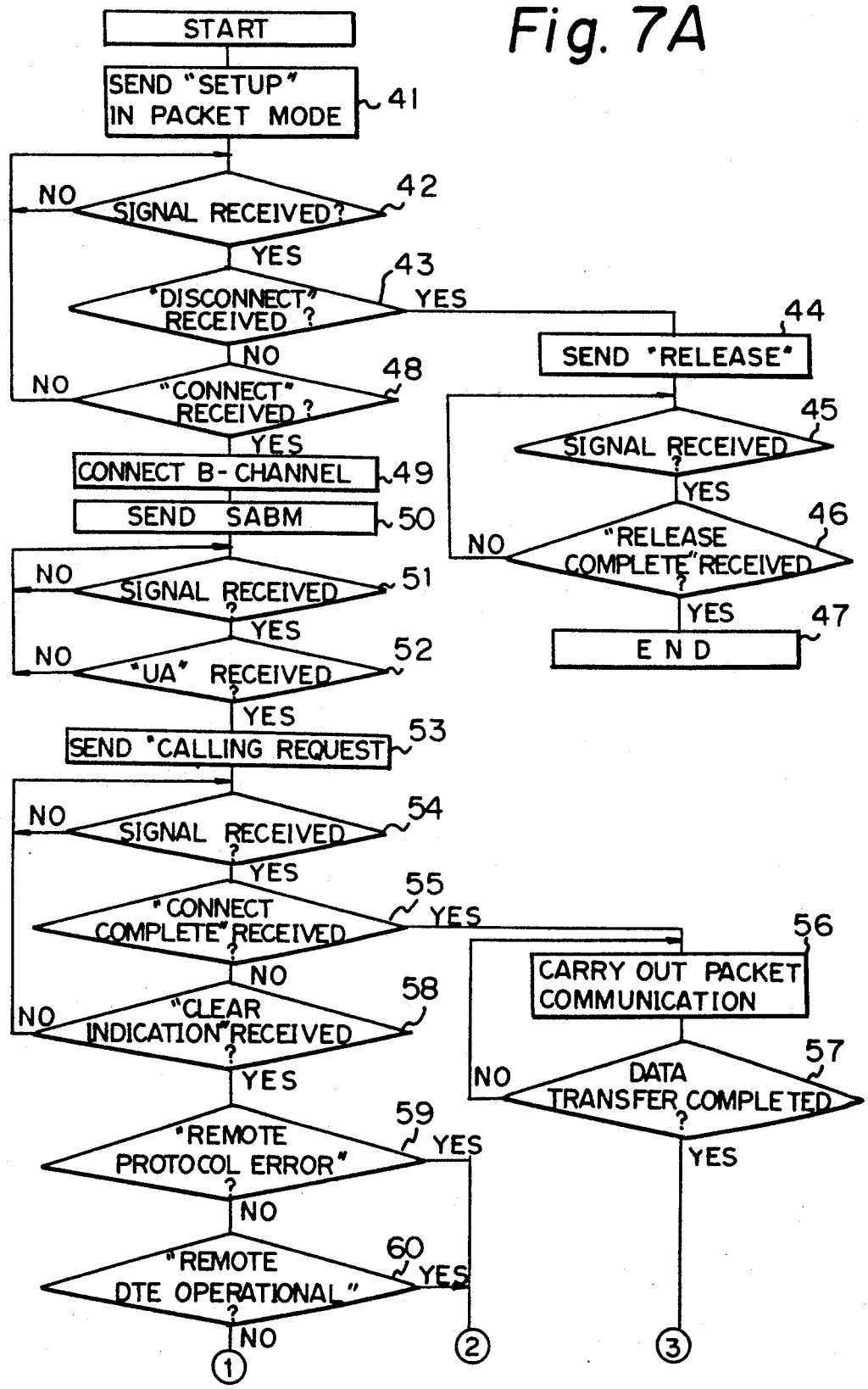
FIGS. 7A and 7B shows an operation of terminal equipment according to the second embodiment of the present invention.
Figure 7B:
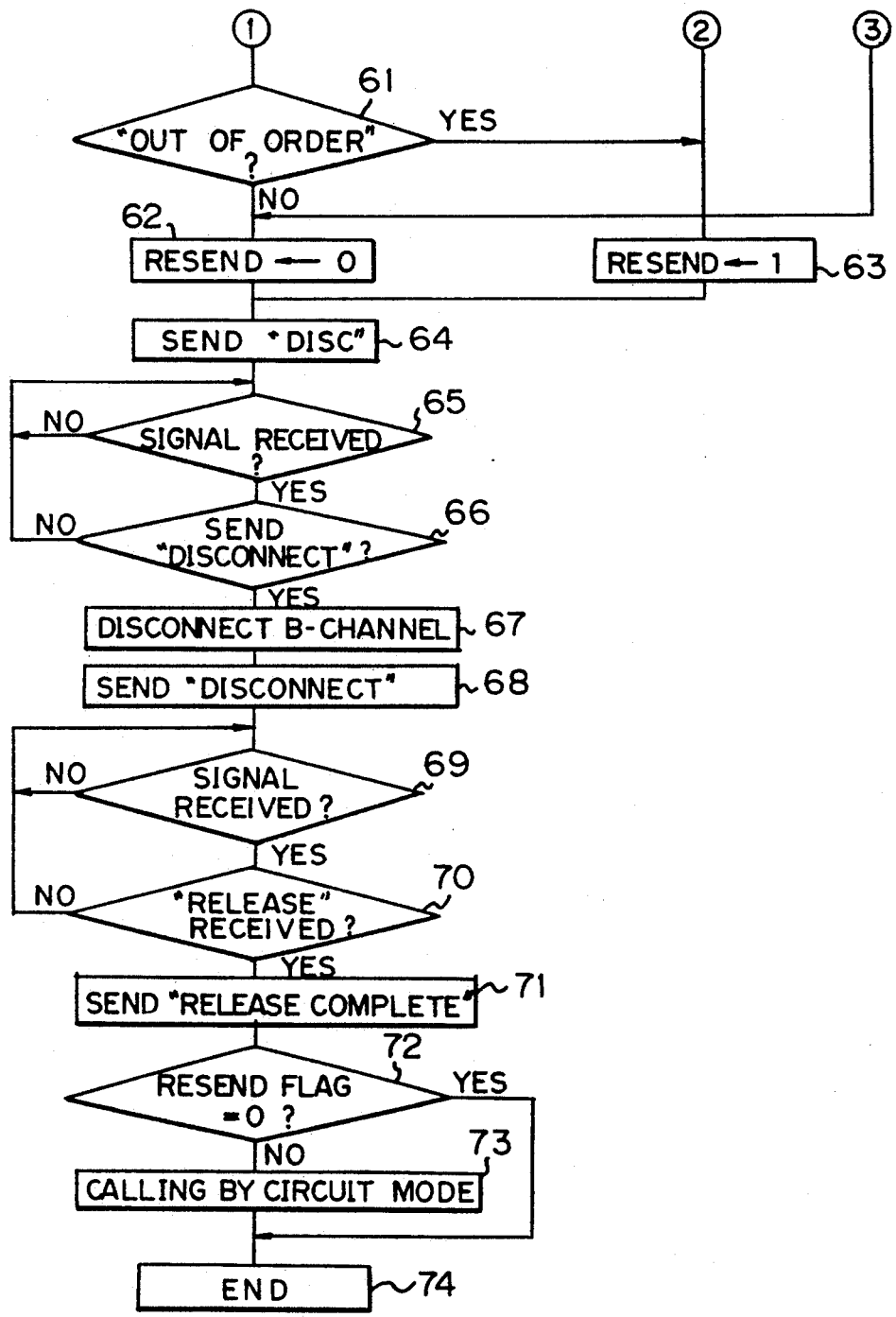

FIGS. 7A and 7B show an operation of terminal equipment according to the second embodiment of the present invention, wherein the terminal equipment can operate with either a circuit switching system 100 or a packet switching system 102. In the second embodiment, the terminal equipment first starts a calling procedure by the circuit switching mode.

In the step 41 in FIG. 7A, the terminal equipment sends a SETUP message to the network to initiate a call, where the SETUP message includes the bearer capability information element wherein the transfer mode is set to "packet mode" which corresponds to the aforementioned packet switching mode.

Next, when the terminal equipment receives a DISCONNECT message from the network in the steps 42 and 43, the operation goes to the step 44 to sends a RELEASE message to the INS network. Then, when a RELEASE COMPLETE message is received form the INS network in the steps 45 and 46, the operation is completed in the step 47.

When the terminal equipment receives a CONNECT message from the network in the steps 42 and 48, the operation goes to the step 49 to connect the terminal equipment at the calling party to a B-channel, and sends an SABM command to the INS network through the B-channel. When a UA response is received from the INS network in the steps 51 and 52, the terminal equipment at the calling party sends a Calling Request packet to the INS network in the step 53. Then, when a Connect Complete packet is received in the steps 54 and 55, the operation goes to the step 56 to carry out a packet communication for transferring data. When the data transfer is determined to be completed in the step 57, a Resend flag is set to zero in the step 62. Then, the terminal equipment at the calling party sends a Disconnect frame to the INS network in the step 64. When a UA response is received in the steps 65 and 66, the B-channel is disconnected in the step 67, and a DISCONNECT message is sent to the INS network in the step 68. When a RELEASE message is received in the steps 69 and 70, a RELEASE COMPLETE message is sent to the INS network in the step 71. Then, when it is determined that the Resend flag is set to zero, in the step 72, the operation is completed in the step 74. When it is determined that the Resend flag is not set to zero, in the step 72, a calling operation is initiated by the circuit switching mode in the step 73.

When a Clear Indication packet is received in the steps 54 to 58, it is determined, in the steps 59, 60, and 61, what a cause information element which is included in the Clear Indication packet indicates. In the example of FIG. 7A, the determinations are carried out regarding the cause information elements "Remote Procedure Error", "Out of Order", and "Remote DTE operational". Although one of the above is sent as a cause information element with a Clear Indication packet from the current INS network in Japan when the terminal equipment in the called party is not able to carry out data communication in the same mode as the terminal equipment in the calling party (the packet switching mode), other cause information elements may be included in the DISCONNECT message in other ISDN networks, and those can be known by experiment.

When one of the above cause information elements is received in the steps 59 to 61, the operation goes to the step 63 to set the Resend flag to one. Then, the operation goes to the step 64. The operations after the step 64 are the same as explained above, except that the operation of the initiation of the data communication by the circuit switching mode is carried out in the step 73, due to the Reset flag which is equal to one.

When none of the above cause information elements is received in the steps 58 to 61, the operation goes to the step 62 to set the Resend flag to zero, and the operation thereafter are the same as explained above, where the operation of the initiation of the data communication in the step 73 is not carried out, due to the Reset flag which is equal to zero.

Figure 8:
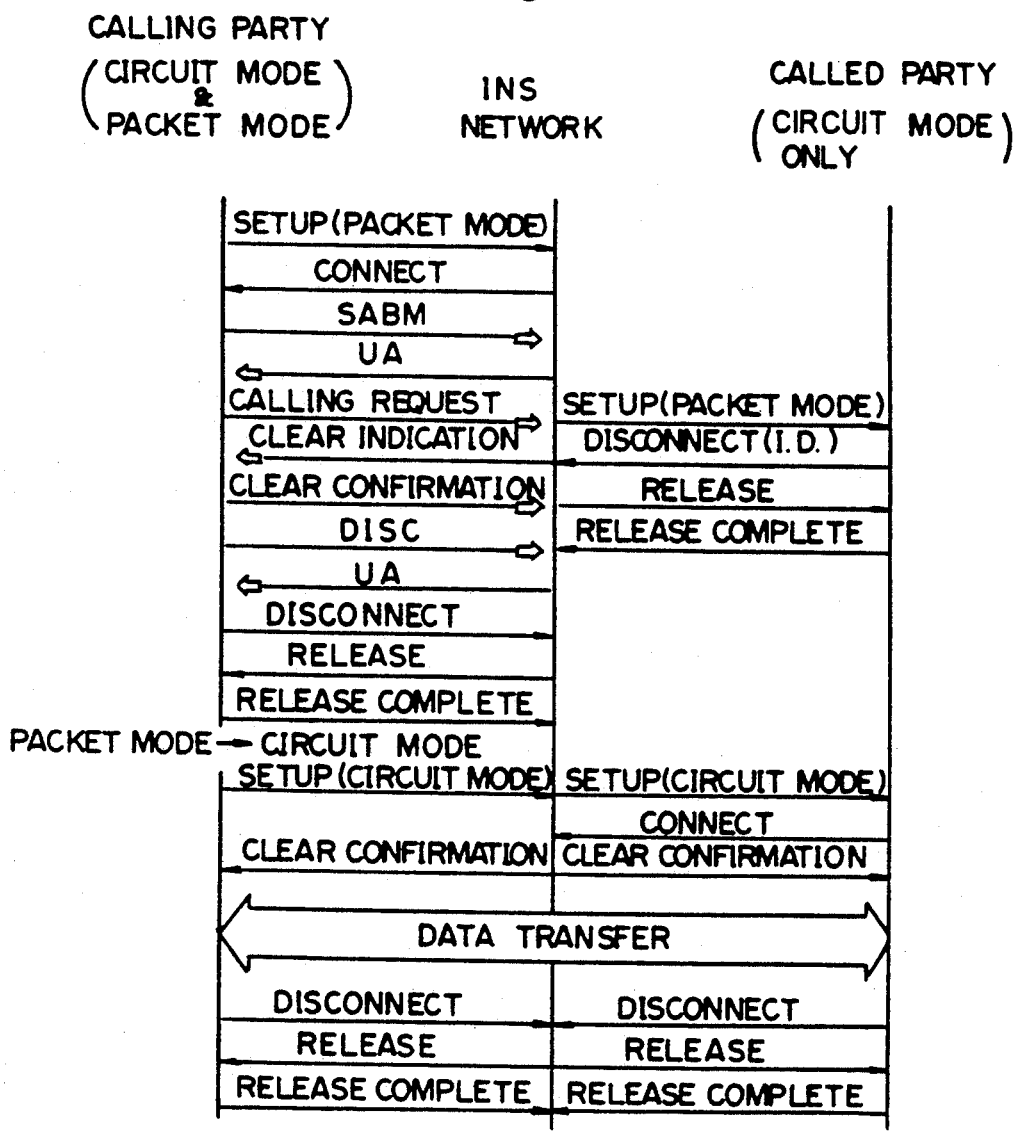

FIGS. 8, and 9 each show an example message sequence between terminal equipment according to the second embodiment of the present invention and terminal equipment at the called party through the INS network, where both the terminal equipment according to the second embodiment of the present invention and the terminal equipment at the called party are connected to the INS network, the terminal equipment at the called party can operate in accordance with a circuit switching communication procedure only, and the terminal equipment according to the second embodiment of the present invention, first tries data communication by a packet switching mode.

In the sequence of FIG. 8, a SETUP message is sent from the terminal equipment at the calling party to the INS network, where the SETUP message includes a transfer mode element which is set to "packet mode". Responding to the above, the INS network returns a CONNECT message to the terminal equipment at the calling party, and thereby the terminal equipment at the calling party is allowed to use a B-channel in the INS network. Then, the terminal equipment at the calling party sends an SABM command (X. 25) to the INS network through the B-channel to establish a link between the terminal equipment at the calling party and the INS network in accordance with the HDLC or LAPB procedure. Responding to the SABM command, the INS network returns a UA response to the terminal equipment at the calling party to acknowledge the receipt and acceptance of the SABM command. Receiving the UA response, the terminal equipment at the calling party sends a Calling Request packet (X. 25) to the INS network.

Receiving the Calling Request packet, the INS network sends a SETUP message to the terminal equipment at the called party, wherein a transfer mode is set as the "packet mode". Since the terminal equipment at the called party is not able to carry out data communication by the packet switching mode, the terminal equipment at the called party returns a DISCONNECT message to the INS network, where the DISCONNECT message includes a cause information element which indicates "Incompatible Destination". Receiving the DISCONNECT message, the INS network sends a Clear Indication packet to the terminal equipment at the calling party. Responding to the Clear Indication packet, the terminal equipment at the calling party returns a Clear Confirmation packet (X. 25) to the INS network. Receiving the Clear Confirmation packet, the INS network sends a RELEASE message to the terminal equipment at the called party, and the terminal equipment at the called party returns a RELEASE COMPLETE message to the INS network. On the other hand, the terminal equipment at the calling party sends a Disconnect frame (DISC) to the INS network, and then, the INS network returns a UA response to the terminal equipment at the calling party. Thus, the control is shifted from the B-channel to the D-channel, and the terminal equipment at the calling party sends a DISCONNECT message to the INS network. Then, the INS network returns a RELEASE message to the terminal equipment at the calling party, and, responding to the RELEASE message, the terminal equipment at the calling party returns a RELEASE COMPLETE message to the INS network to complete the data communication by the packet mode.

Then, the terminal equipment at the calling party retries to initiate a calling by the circuit switching mode, i.e., the terminal equipment at the calling party sends a SETUP message which include the transfer mode element being set to "circuit mode' to the INS network. Receiving the SETUP message, the INS network sends a SETUP message which include the transfer mode element being set to "circuit mode" to the terminal equipment at the called party. Responding to the SETUP message, the terminal equipment at the called party returns a CONNECT message to the INS network. Receiving the CONNECT message, the INS network sends a CONNECT message to the terminal equipment at the calling party, and a CONNECT ACKNOWLEDGE message to the terminal equipment at the called party. Thus, a data transfer can be carried out between the terminal equipment at the calling party and the terminal equipment at the called party through the INS network.

When the above data transfer is completed, the terminal equipment at the calling party sends a DISCONNECT message to the INS network, and the INS network sends a DISCONNECT message to the terminal equipment at the called party. Responding to the DISCONNECT message, the terminal equipment at the called party returns a RELEASE message to the INS network, and the INS network sends a RELEASE message to the terminal equipment at the calling party. Responding to the RELEASE message, the terminal equipment at the calling party returns a RELEASE COMPLETE message to the INS network, and the INS network sends a RELEASE COMPLETE message to the terminal equipment at the called party to complete the data communication.

In the sequence of FIG. 9, when a SETUP message of the packet switching mode is sent to the terminal equipment at the called party, where the terminal equipment at the called party is not able to carry out data communication by the packet switching mode, the terminal equipment at the called party returns no response. When no response is returned from the terminal equipment at the called party for a predetermined time, the INS network sends a Clear Indication packet to the terminal equipment at the calling party. Receiving the Clear Indication packet, the terminal equipment at the calling party returns a Clear Confirmation packet to the INS network. Thereafter, the rest of the sequence is the same as the sequence of FIG. 8.

(4) Other Matters

Although not shown, the terminal equipment according to the present invention, comprises a MPU, ROM, RAM, and a communication LSI, which are conventionally available, and all the above operations are carried out by software control.

In addition, although all the above embodiments are explained with the INS network in Japan, since the INS network is in accordance with the CCITT recommendation, all the features explained above are applicable to all ISDN networks in accordance with the CCITT recommendation.

I claim:

1. Integrated services digital network terminal equipment comprising:
   circuit switching communication means for carrying out data communication in accordance with a circuit switching procedure;
   packet communication means for carrying out the data communication in accordance with a packet communication procedure;
   manual starting means for receiving a manual start input and for setting up a call using a predetermined one of said circuit switching communication means and said packet communication means when receiving the manual start input;
   unsuccessful try detecting means for detecting that the data communication has not been successfully begun by said manual starting means; and
   retrying means for setting up the call using said circuit switching communication means when said unsuccessful try detecting means detects that said packet communication means is unsuccessful in setting up the data communication and for setting up the call using said packet communication means when said unsuccessful try detecting means detects that said circuit communication means is unsuccessful in setting up the data communication.

2. Integrated services digital network terminal equipment according to claim 1, wherein said unsuccessful try detecting means includes means for detecting that the data communication has not been successfully begun by said manual starting means, by detecting a deviation of the setting up of the network.

3. Integrated services digital network terminal equipment according to claim 2, wherein said unsuccessful try detecting means includes means for receiving a DISCONNECT message, where the DISCONNECT message includes a cause information element indicating one of "No Route to Destination", "No User Responding", and "Incompatible Destination", when said manual starting means begins setting up the call using said circuit switching communication means.

4. Integrated services digital network terminal equipment according to claim 2, wherein said unsuccessful try detecting means includes means for receiving a Clear Indication packet, where the Clear Indication packet includes a cause information element indicating one of "Remote Procedure Error", "Out of Order", and "Remote DTE Operational", when said manual starting means begins setting up the call using said packet communication means.

5. A method for determining a correct protocol for establishing communication between a first terminal and a second terminal, comprising the steps of:
   (a) sending first data representing a first protocol to the second terminal from the first terminal;
   (b) determining whether the first protocol is the correct protocol in dependence upon the first data;
   (c) sending second data representing a second protocol to the second terminal from the first terminal if the first protocol is not the correct protocol;
   (d) determining whether the second protocol is the correct protocol in dependence upon the second data; and
   (e) establishing communication between the first terminal and the second terminal when one of the first protocol and the second protocol is the correct protocol.

6. A method according to claim 5, wherein the correct protocol comprises one of a circuit switching procedure and a packet communication procedure.

7. A method according to claim 5, further comprising the steps of:
   (e) transmitting third data from the first terminal to the second terminal when the correct protocol is established; and
   (f) receiving fourth data from the second terminal at the first terminal when the correct protocol is established.

8. A method according to claim 5, wherein step (b) includes the sub-step of:
   (b1) sending a disconnect signal from the second terminal to the first terminal when the first protocol is not the correct protocol.

9. A method according to claim 7, further comprising the step of (g) discontinuing communication between the first terminal and the second terminal after completion of said transmitting in step (e).

10. A method according to claim 7, further comprising the step of (g) discontinuing communication between the first terminal and the second terminal after completion of said receiving in step (f).

* * * * *